United States Patent
Mizutani et al.

(10) Patent No.: US 9,175,952 B2
(45) Date of Patent: Nov. 3, 2015

(54) SHAPE MEASUREMENT METHOD AND SHAPE MEASUREMENT APPARATUS FOR TIRES

(75) Inventors: Akinobu Mizutani, Kodaira (JP); Daisuke Kato, Kodaira (JP); Akira Togii, Kodaira (JP); Kenichi Okude, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 485 days.

(21) Appl. No.: 13/635,611

(22) PCT Filed: Mar. 18, 2011

(86) PCT No.: PCT/JP2011/056575
§ 371 (c)(1),
(2), (4) Date: Sep. 17, 2012

(87) PCT Pub. No.: WO2011/115257
PCT Pub. Date: Sep. 22, 2011

(65) Prior Publication Data
US 2013/0002856 A1   Jan. 3, 2013

(30) Foreign Application Priority Data
Mar. 18, 2010   (JP) ................................. 2010-061793

(51) Int. Cl.
| | |
|---|---|
| *G01M 17/02* | (2006.01) |
| *G01B 11/16* | (2006.01) |
| *G01B 11/22* | (2006.01) |
| *G01B 11/24* | (2006.01) |

(52) U.S. Cl.
CPC ............. *G01B 11/24* (2013.01); *G01M 17/027* (2013.01)

(58) Field of Classification Search
CPC .................................................. G01M 17/027
USPC .......................................................... 348/128
See application file for complete search history.

(56) References Cited

U.S. PATENT DOCUMENTS

| | | | | |
|---|---|---|---|---|
| 2008/0202229 | A1* | 8/2008 | Maehner et al. ................ | 73/146 |
| 2009/0272183 | A1 | 11/2009 | Sukegawa et al. | |
| 2009/0281738 | A1* | 11/2009 | Fujisawa ........................ | 702/35 |

FOREIGN PATENT DOCUMENTS

| | | |
|---|---|---|
| JP | B2-8-1377 | 2/1987 |
| JP | A-2-176408 | 7/1990 |

(Continued)

OTHER PUBLICATIONS

International Search Report issued in International Patent Application No. PCT/JP2011/056575 mailed May 10, 2011.

*Primary Examiner* — Anner Holder
*Assistant Examiner* — Mikhail Itskovich
(74) *Attorney, Agent, or Firm* — Oliff PLC

(57) ABSTRACT

A shape measurement method for a tire includes: detecting an outer surface shape data and an inner surface shape of the tire from image data of the outer surface and the inner surface; subjecting irregularities along the tire circumferential direction around the tire in the outer surface shape data and in the inner surface shape data to Fourier transformation to take out primary waveform components respectively; adjusting the tire circumferential positions of both of the waveform components to adjust the tire circumferential positions thereof; adjusting the tire radial direction cross section positions of the outer surface shape data and the inner surface shape data from information about the placement angles and the positions of the first camera and the second camera; and synthesizing the outer surface shape data and the inner surface shape data based on the adjusted tire circumferential positions and the tire radial direction cross section positions.

8 Claims, 3 Drawing Sheets

(56) References Cited

FOREIGN PATENT DOCUMENTS

| JP | A-2000-343915 | 12/2000 |
|---|---|---|
| JP | A-2003-50123 | 2/2003 |
| JP | A-2007-132807 | 5/2007 |
| JP | A-2008-26165 | 2/2008 |
| JP | A-2008-196881 | 8/2008 |
| JP | A-2008-196975 | 8/2008 |
| JP | A-2009-139297 | 6/2009 |

* cited by examiner

SHAPE MEASUREMENT METHOD AND SHAPE MEASUREMENT APPARATUS FOR TIRES

TECHNICAL FIELD

The present invention relates to a shape measurement method and a shape measurement apparatus for a tire (hereinafter, also simply referred to as "measurement method" and "measurement apparatus"), and particularly, to a shape measurement method and a shape measurement apparatus for a tire for detecting the thickness of the tire.

BACKGROUND ART

The control of the thickness of a tire is important also from the viewpoint of detecting a defective product. However, conventionally, there has been no method of measuring the thickness of a tire around the tire with ease, and usually the thickness has been evaluated by sensory inspection by an operator. As a method of measuring the cross section of the tire by a non-destructive inspection, for example, a method using a CT scanning is known (see, for example, Patent Document 1).

Further, as a technique of non-destructively measuring the thickness of the cross section of a tire, for example, Patent Document 2 discloses a tire thickness measurement tool comprising a non-contact type displacement sensor on the tip of an axis thereof which is inserted into the tire, wherein the thickness of the tire is measured based on the distance to the inner surface of the tire measured by the above-mentioned displacement sensor. Still further, as a technique of a tire shape inspection, Patent Document 3 discloses a tire shape inspection method and an apparatus thereof which can remove a knurling portion from the tire side portion and precisely detect the outer surface shape of tire side portion, and Patent Document 4 discloses an apparatus for creating a reference shape data for inspecting a tire in which the three-dimensional shape data of a split mold inner surface which vulcanizes and molds a tire is obtained and a reference shape data for inspecting a tire is created, respectively.

RELATED ART DOCUMENTS

Patent Documents

Patent Document 1: Japanese Examined Patent Application Publication No. 08-001377 (Claims or the like)
Patent Document 2: Japanese Unexamined Patent Application Publication No. 2003-050123 (Claims or the like)
Patent Document 3: Japanese Unexamined Patent Application Publication No. 2009-139297 (Claims or the like)
Patent Document 4: Japanese Unexamined Patent Application Publication No. 2008-26165 (Claims or the like)

SUMMARY OF THE INVENTION

Problems to be Solved by the Invention

However, in the conventional method of using a CT scanning, there has been a problem in that it takes a lot of time for the measurement around the tire. On the other hand, although there is a technique as described in Patent Document 2, it has been desired that a technique in which the thickness of a tire is measured around the tire more precisely in a shorter time is established.

Accordingly, an object of the present invention is to overcome the above-mentioned problems and to provide a shape measurement method and a shape measurement apparatus for a tire in which the thickness of a tire can be measured around the tire precisely in a short time.

Means for Solving the Problems

The present inventors intensively studied to find that the above-mentioned problems can be overcome by using a method in which the outer surface shape and the inner surface shape of a tire are measured individually by a light-section method and the obtained shape data are synthesized by being subjected to a position adjustment for both in the tire circumferential direction and in tire radial direction cross section, thereby completing the present invention.

That is, the shape measurement method for a tire of the present invention comprises:
  an outer surface shape measurement step in which the outer surface of a tire is irradiated with a slit light, a slit light irradiation portion of the outer surface is photographed by a first camera, and, from the image data of the photographed light irradiation portion of the outer surface, an outer surface shape data of the tire is detected;
  an inner surface shape measurement step in which the inner surface of the tire is irradiated with a slit light, a slit light irradiation portion of the inner surface is photographed by a second camera, and, from the image data of the photographed light irradiation portion of the inner surface, an inner surface shape data of the tire is detected;
  an outer surface primary component extraction step in which irregularities along the tire circumferential direction around the tire in the outer surface shape data obtained in the outer surface shape measurement step are subjected to Fourier transformation to take out a primary waveform component;
  an inner surface primary component extraction step in which irregularities along the tire circumferential direction around the tire in the inner surface shape data obtained in the inner surface shape measurement step are subjected to Fourier transformation to take out a primary waveform component;
  a circumferential position adjustment step in which the tire circumferential positions of the waveform component of the outer surface shape data and the waveform component of the inner surface shape data which have been taken out are adjusted to adjust the tire circumferential positions of the outer surface shape data and the inner surface shape data;
  a cross section position adjustment step in which, from information about the placement angles and the positions of the first camera and the second camera, the tire radial direction cross section positions of the outer surface shape data and the inner surface shape data are adjusted; and
  a shape data synthesis step in which, based on the adjusted tire circumferential positions and the tire radial direction cross section positions, the outer surface shape data and the inner surface shape data are synthesized.

The shape measurement apparatus for a tire of the present invention comprises:
  an outer surface image data detecting means composed of a first light irradiation means in which a slit light is irradiated on the outer surface of a tire and a first camera in which the slit light irradiation portion of the outer surface is photographed to generate an image data;

an inner surface image data detecting means composed of a second light irradiation means in which a slit light is irradiated on the inner surface of the tire and a second camera in which the slit light irradiation portion of the inner surface is photographed to generate an image data; and an image processing means in which: the outer surface shape data of the tire is detected from image data of the photographed light irradiation portion of the outer surface, and irregularities along the tire circumferential direction around the tire in the outer surface shape data are subjected to Fourier transformation to take out a primary waveform component; as well as the inner surface shape data of the tire is detected from image data of the photographed light irradiation portion of the inner surface, and irregularities along the tire circumferential direction around the tire in the inner surface shape data are subjected to Fourier transformation to take out a primary waveform component; the tire circumferential positions of the waveform component of the outer surface shape data and the waveform component of the inner surface shape data which have been taken out are adjusted to adjust the tire circumferential positions of the outer surface shape data and the inner surface shape data; from information about the placement angles and the positions of the first camera and the second camera, the tire radial direction cross section positions of the outer surface shape data and the inner surface shape data are adjusted; and the outer surface shape data and the inner surface shape data are synthesized.

In the present invention, it is preferred that, in the circumferential position adjustment step, the tire circumferential positions of the waveform component of the outer surface shape data and the waveform component of the inner surface shape data be adjusted using a bead toe as a reference.

Effect of the Invention

In the present invention, by employing the above-mentioned constitutions, a shape measurement method and a shape measurement apparatus for a tire in which the thickness of a tire can be measured around the tire precisely in a short time by a non-destructive measurement can be attained.

MODES FOR CARRYING OUT THE INVENTION

An embodiment of the present invention will now be described in detail with reference to the Drawings.

In the present invention, firstly, the outer surface shape and the inner surface shape of a tire to be inspected are measured individually by using a light-section method to obtain shape data (an outer surface shape measurement step and an inner surface shape measurement step).

Figure 1:
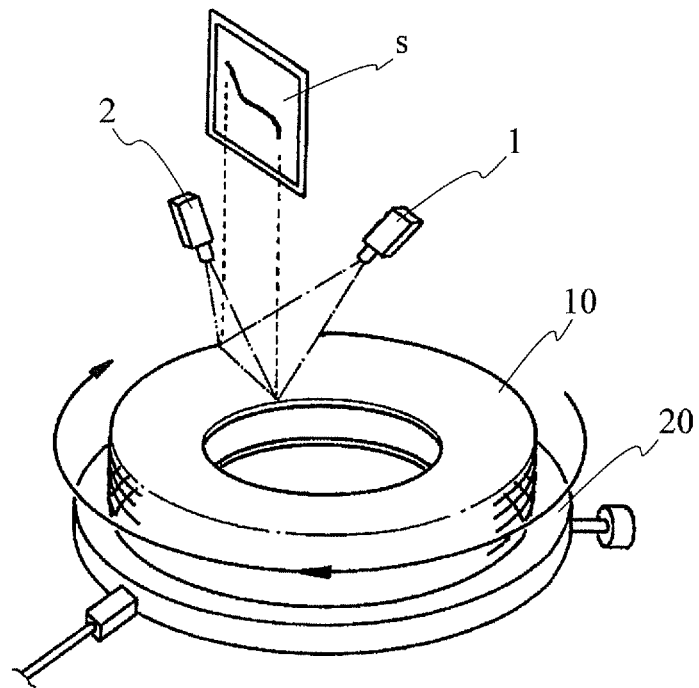
FIG. 1 is a schematic illustration of an outer surface shape measurement step for a tire of the present invention.

Specifically, for example, the measurement of the tire outer surface shape can be performed in such a manner as illustrated in FIG. 1. That is, firstly, while a tire 10 to be inspected is mounted on a rotation device 20 to be rotated, the outer surface of the tire 10 is irradiated with a slit light by a light irradiation means 1 and the slit light irradiation portion of the outer surface is photographed by a camera 2. The light irradiation means 1 can be composed of, for example, a semiconductor laser as a light source, a collimator lens constituted of a spherical lens for converging a beam, and a cylindrical lens for diverging the converged beam in one direction. As a camera 2, an area camera, such as a CCD camera can be employed. Then, from image data of the photographed image S of the light irradiation portion of the tire outer surface, an outer surface shape data of the tire is detected. The detection of the outer surface shape data of the tire from this image data can be performed by an image processing means, not shown, connected to the camera 2. As such an image processing means, a general arithmetic processing unit (PC) can be used.

Figure 2:
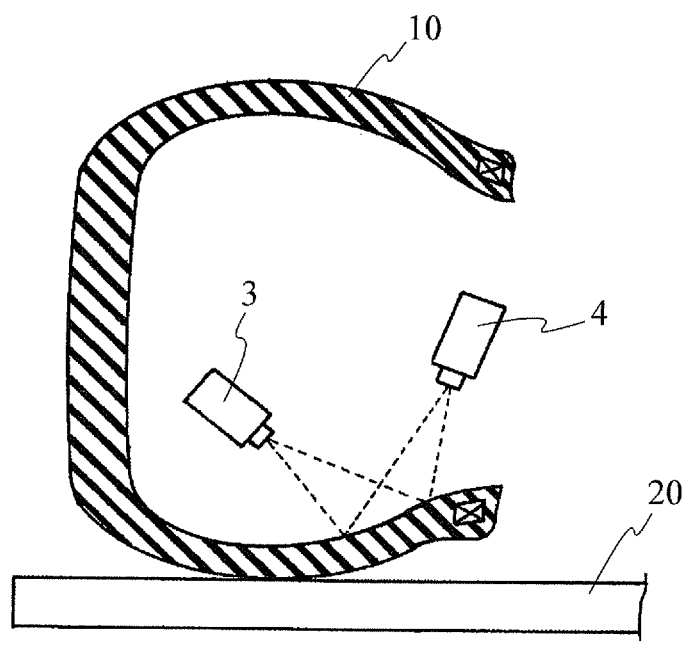
FIG. 2 is a schematic illustration of an inner surface shape measurement step for a tire of the present invention.

In the same manner, the measurement of the tire inner surface shape can be performed, for example, in such a manner as illustrated in FIG. 2. That is, firstly, while the tire 10 to be inspected is mounted on the rotation device 20 to be rotated, the inner surface of the tire 10 is irradiated with a slit light by a light irradiation means 3 and the slit light irradiation portion of the inner surface is photographed by a camera 4. Then, from image data of the photographed light irradiation portion of the tire inner surface, an inner surface shape data of the tire is detected. The detection of the inner surface shape data of the tire from this image data can also be performed in the same manner as mentioned above by an image processing means, not shown, connected to the camera 4.

Next, for the obtained outer surface shape data and the inner surface shape data, the position adjustment is performed both in the tire circumferential direction and in the tire radial direction cross section. First, for each of the above-obtained outer surface shape data and inner surface shape data, irregularities along the tire circumferential direction around the tire in the data at one point in the tire radial direction is subjected to Fourier transformation to take out a primary waveform component (an outer surface primary component extraction step and an inner surface primary component extraction step). Next, the tire circumferential positions of the waveform component of the outer surface shape data and the waveform component of the inner surface shape data are adjusted to adjust the tire circumferential positions of the outer surface shape data and the inner surface shape data (a circumferential position adjustment step). The tire circumferential positions of the waveform component of the outer surface shape data and the waveform component of the inner surface shape data can be adjusted by firstly moving the data based on the relative position of the camera calculated by information about the placement angle and the position of the first and the second cameras 2, 4 used in the above-mentioned shape measurement, and then by determining the phase difference between the waveform components to move the data so as to be in phase with each other.

Here, as the reference when the tire circumferential positions of the waveform component of the outer surface shape data and the waveform component of the inner surface shape data are adjusted, a bead toe which is an overlapping portion of the outer surface shape data and the inner surface shape data can be used. That is, by adjusting the phases of the waveform components of irregularities along the tire circumferential direction around the tire at the bead toe, the tire circumferential positions of the outer surface shape data and the inner surface shape data can be adjusted. At the bead toe, small irregularities generated on the tire surface other than the tire shape influences on both an image on the inner surface and an image on the outer surface. As such small irregularities, for example, which exist on the inner surface of the tire and do not exist on the outer surface, an overlapping joint portion of an inner liner is exemplified. By performing the above-mentioned adjustment using the bead toe as a reference, the effect of the above-mentioned small irregularities can therefore be minimized.

From the information about the placement angles and the positions of the first and the second cameras 2, 4 used in the above-mentioned shape measurement, the relative position of the cameras are calculated, and the tire radial direction cross section positions of the outer surface shape data and the inner surface shape data are adjusted (a cross section position adjustment step). By these steps, the positions of the outer surface shape data and the inner surface shape data are adjusted both in the tire circumferential direction and in the tire radial direction cross section, and the positions of both data can three-dimensionally correspond to each other. The outer surface shape data and the inner surface shape data can be thus synthesized based on the adjusted tire circumferential position and tire radial direction cross section position (a shape data synthesis step). In the present invention, the position adjustment and the synthesis of the above-mentioned outer surface shape data and the inner surface shape data can also be performed by an image processing means not shown.

In the present invention, in a series of the above-mentioned steps, by synthesizing the outer surface shape data and the inner surface shape data obtained in the light-section method, the thickness data around the tire can be obtained precisely by a non-destructive measurement. Since the measurement of the tire outer surface shape and the inner surface shape by the light-section method can be automatically performed around the tire, by the present invention, the thickness data around the tire can be obtained in a shorter time as compared to a conventional method. Although the positions of the outer surface shape data and the inner surface shape data can be adjusted by the angles and coordinates of the cameras, a precise adjustment of the positions cannot be performed when the angle of the camera slips. Since the position adjustment using the above-mentioned waveform component is performed in the tire circumferential direction, and then the position adjustment in the tire radial direction cross section is performed, the present invention does not have such a problem.

By the present invention, cross sectional shape data which is obtained by synthesizing the outer surface shape data and the inner surface shape data across the tire radial direction can be obtained. In particular, since judgment of the quality of the product can be performed easily by evaluating the thickness of the tire for the bead portion, those obtaining only the thickness data of the bead portion are also useful from the viewpoint of the judgment of the quality of a tire. By detecting, from such thickness data, a portion where the thickness is abnormal, judgment of the quality of a product tire can be performed easily. By the present invention, the measurement of the shape of the cross section can be performed for all of the product tires and the measurement which has been conventionally a sensory inspection by a worker becomes the one which can be judged numerically. As the result, more precise judgment of the quality of a tire can be performed.

In the present invention, the measurement of the outer surface shape and the inner surface shape of a tire by a light-section method is not particularly limited regarding the measurement conditions, measurement apparatus or the like, and the measurement can be performed appropriately according to a conventional method.

Example

The present invention will now be described concretely by way of Example.

For a bead portion of a tire having a tire size of 225/55/R17, the thickness was measured around the tire according the following procedure. Firstly, while a tire to be inspected was mounted on a rotation device 20 as illustrated in FIG. 1 to be rotated, the outer surface of a tire 10 was irradiated with a slit light by a light irradiation means 1, and the slit light irradiation portion of the outer surface was photographed by a CCD camera 2. Then, by using an arithmetic processing unit (PC), not shown, connected to the camera, the outer surface shape data of the tire was detected from the photographed image data of the light irradiation portion of the outer surface.

In the same manner as above, while a tire to be inspected was mounted on a rotation device 20 as illustrated in FIG. 2 to be rotated, the inner surface of a tire 10 was irradiated with a slit light by a light irradiation means 3, and the slit light irradiation portion of the inner surface was photographed by a CCD camera 4. In the same manner as mentioned above, the inner surface shape data of the tire was detected from the photographed image data of the light irradiation portion of the inner surface. As the light irradiation means 1 and 3, those composed of a semiconductor laser, a collimator lens and a cylindrical lens were used.

Figure 3:
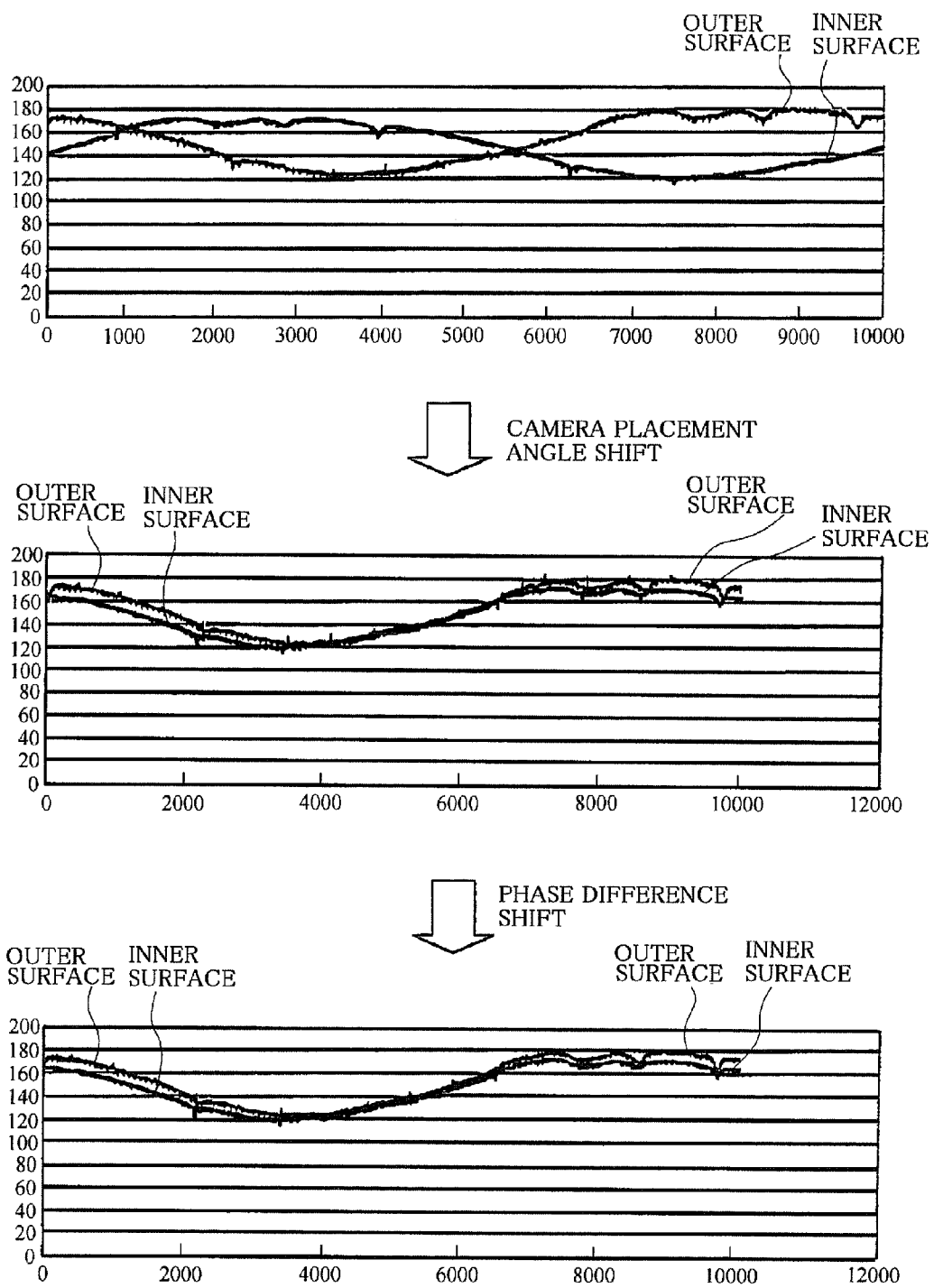
FIG. 3 is an illustration of a circumferential position adjustment step for outer surface shape data and inner surface shape data in Example.

Next, by using the above-mentioned PC, for each shape data at a bead portion of the obtained outer surface shape data and inner surface shape data, irregularities along the tire circumferential direction around the tire in the shape data was subjected to Fourier transformation to take out a primary waveform component. In FIG. 3(*a*), the outer surface shape data and the inner surface shape data along the tire circumferential direction around the tire at the bead toe.

Next, by using the above-mentioned PC, the outer surface shape data and the inner surface shape data of the bead toe in the tire circumferential direction illustrated in FIG. 3(*a*) were shifted based on the relative positions of CCD cameras 2,4 in the tire circumferential direction calculated from the information about the placement angles and the positions of the cameras used in the above-mentioned measurement (FIG. 3(*b*)), and further, shifted in an amount of the phase difference based on the phase difference between both the waveform component of the outer surface shape data and the waveform component of the inner surface shape data (FIG. 3(*c*)), thereby adjusting the tire circumferential positions of the outer surface shape data and the inner surface shape data.

Next, by using the above-mentioned PC, the relative positions of the CCD cameras 2,4 in the tire radial direction cross section were calculated from the information about the placement angles and the positions of the cameras, and the data was moved in an amount of the relative positions of these cameras, thereby adjusting the above-mentioned tire radial direction cross section position of the outer surface shape data and the inner surface shape data.

Figure 4:
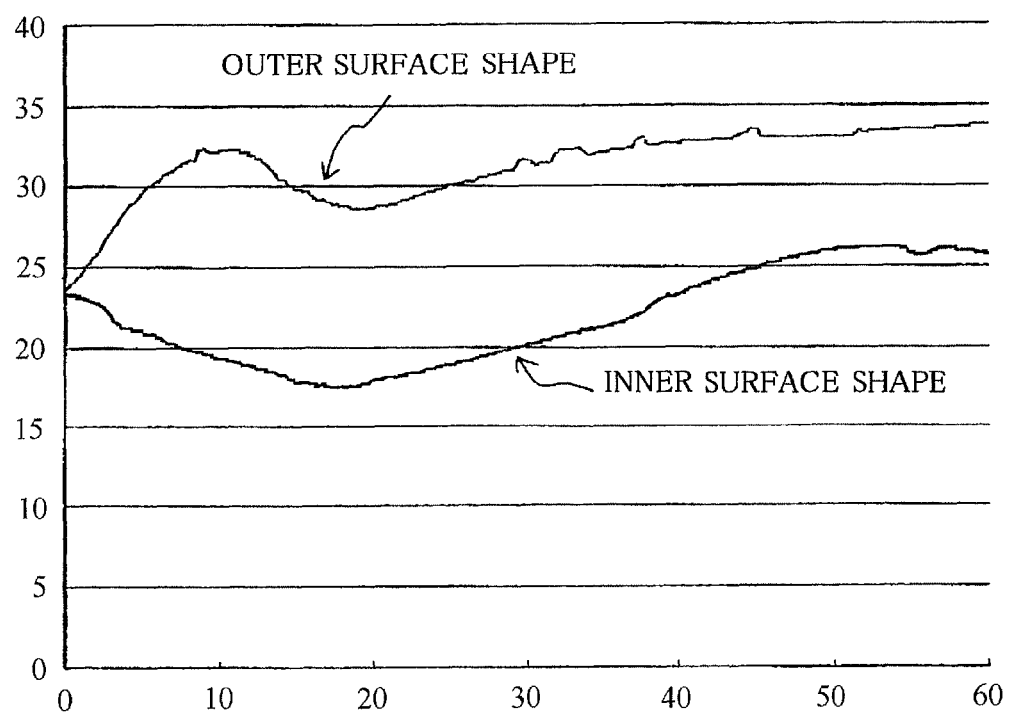
FIG. 4 is an illustration of cross sectional shape data of a bead portion of a tire obtained in Example.

Thereafter, by synthesizing the above-mentioned outer surface shape data and inner surface shape data based on the adjusted tire circumferential positions and tire radial direction cross section positions, the cross sectional shape data of the tire bead portion as illustrated in FIG. 4 were obtained around the tire.

DESCRIPTION OF SYMBOLS

1, 3 Light Irradiation Means
2, 4 Camera
10 Tire
20 Rotation Device

The invention claimed is:

1. A shape measurement method for a tire comprising:

an outer surface shape measurement step in which the outer surface of a tire is irradiated with a slit light, a slit light irradiation portion of the outer surface is photographed by a first camera, and, from the image data of the photographed light irradiation portion of the outer surface, an outer surface shape data of the tire is detected;

an inner surface shape measurement step in which the inner surface of the tire is irradiated with a slit light, a slit light irradiation portion of the inner surface is photographed by a second camera, and, from the image data of the photographed light irradiation portion of the inner surface, an inner surface shape data of the tire is detected;

an outer surface primary component extraction step in which irregularities along the tire circumferential direction around the tire in the outer surface shape data obtained in the outer surface shape measurement step are subjected to Fourier transformation to take out a primary waveform component;

an inner surface primary component extraction step in which irregularities along the tire circumferential direction around the tire in the inner surface shape data obtained in the inner surface shape measurement step are subjected to Fourier transformation to take out a primary waveform component;

a circumferential position adjustment step in which the tire circumferential positions of the waveform component of the outer surface shape data and the waveform component of the inner surface shape data which have been taken out are adjusted to adjust the tire circumferential positions of the outer surface shape data and the inner surface shape data;

a cross section position adjustment step in which, from information about the placement angles and the positions of the first camera and the second camera, the tire radial direction cross section positions of the outer surface shape data and the inner surface shape data are adjusted; and determining thickness data around the tire by synthesizing the outer surface shape data and the inner surface shape data based on the adjusted tire circumferential positions and the tire radial direction cross section positions.

2. The shape measurement method for a tire according to claim 1, wherein, in the circumferential position adjustment step, the tire circumferential positions of the waveform component of the outer surface shape data and the waveform component of the inner surface shape data are adjusted using a bead toe as a reference.

3. A shape measurement apparatus for a tire comprising:

an outer surface image data detecting means composed of a first light irradiation means in which a slit light is irradiated on the outer surface of a tire and a first camera in which the slit light irradiation portion of the outer surface is photographed to generate an image data;

an inner surface image data detecting means composed of a second light irradiation means in which a slit light is irradiated on the inner surface of the tire and a second camera in which the slit light irradiation portion of the inner surface is photographed to generate an image data; and an image processing means in which:

the outer surface shape data of the tire is detected from image data of the photographed light irradiation portion of the outer surface, and irregularities along the tire circumferential direction around the tire in the outer surface shape data are subjected to Fourier transformation to take out a primary waveform component;

the inner surface shape data of the tire is detected from image data of the photographed light irradiation portion of the inner surface, and irregularities along the tire circumferential direction around the tire in the inner surface shape data are subjected to Fourier transformation to take out a primary waveform component;

the tire circumferential positions of the waveform component of the outer surface shape data and the waveform component of the inner surface shape data which have been taken out are adjusted to adjust the tire circumferential positions of the outer surface shape data and the inner surface shape data based on information about the placement angles and the positions of the first camera and the second camera, the tire radial direction cross section positions of the outer surface shape data and the inner surface shape data are adjusted; and thickness data around the tire is determined based on synthesizing the outer surface shape data and the inner surface shape data.

4. The shape measurement apparatus for a tire according to claim 3, wherein the tire circumferential positions of the waveform component of the outer surface shape data and the waveform component of the inner surface shape data are adjusted using a bead toe as a reference.

5. The shape measurement method for a tire according to claim 1, wherein the thickness data comprises a thickness of a cross section of the tire.

6. The shape measurement method for a tire according to claim 1, wherein the thickness data comprises a thickness of a cross section of a bead toe portion of the tire.

7. The shape measurement apparatus for a tire according to claim 3, wherein the thickness data comprises a thickness of a cross section of the tire.

8. The shape measurement apparatus for a tire according to claim 3, wherein the thickness data comprises a thickness of a cross section of a bead toe portion of the tire.

* * * * *